June 9, 1953          A. R. REDROW          2,641,101
TOOTH MEANS FOR SIDE DELIVERY RAKE
Filed March 1, 1950
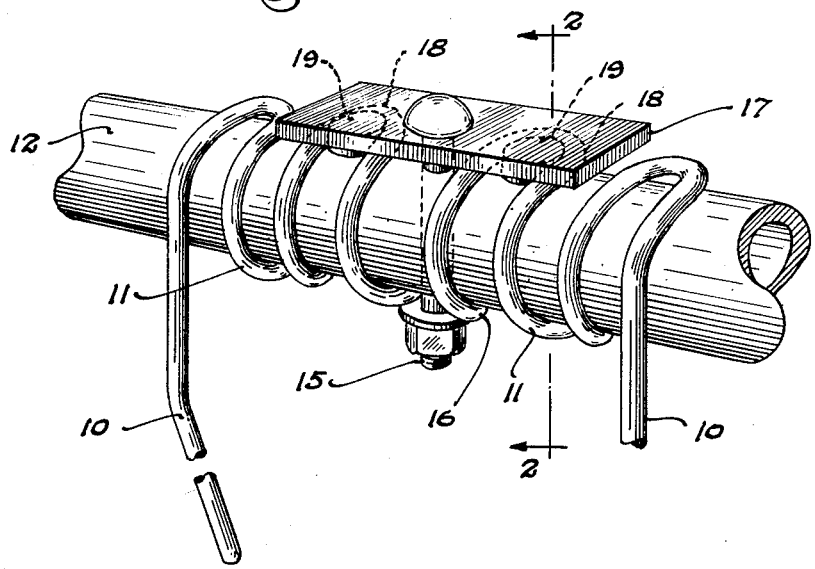
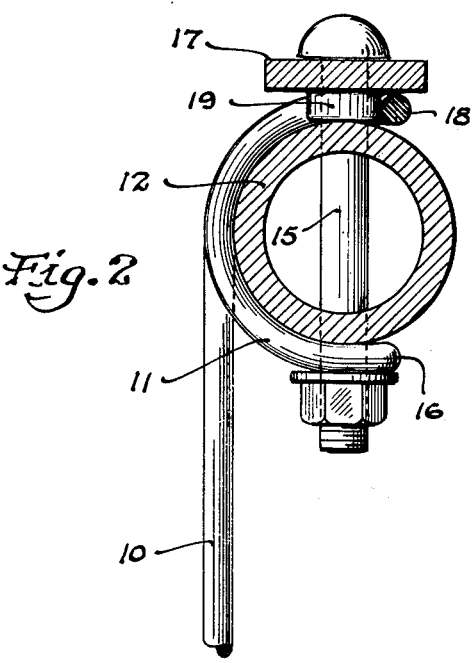
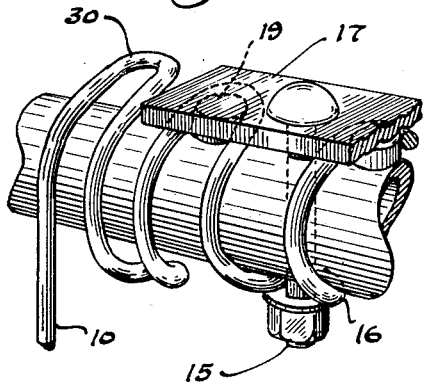
Inventor
Allan R. Redrow
By Richard E. Babcock Jr.
Attorney Patented June 9, 1953

2,641,101

UNITED STATES PATENT OFFICE 2,641,101

TOOTH MEANS FOR SIDE-DELIVERY RAKE

Allan R. Redrow, New Holland, Pa., assignor to The New Holland Machine Division of the Sperry Corporation, New Holland, Pa., a corporation of Delaware Application March 1, 1950, Serial No. 146,986

3 Claims. (Cl. 56—400)

This invention provides an improved spring tooth form having a design such that a plurality of these means may be removably mounted on each of the raking bars carried on the rotating reel of a side delivery rake and tedding machine. Each tooth means preferably takes the form of a length of wire having a serpentine spring shape in the middle thereof with the extending ends serving as the teeth. The serpentine section is also configured to fit partially around the raking bar upon which the teeth means are to be mounted. Each of the tooth means is adapted to be mounted on the side of the rotating bar and may be fixed thereto at the midpoint of the serpentine section so that the spring is free to flex as the teeth hit obstacles or are otherwise loaded while in use.

The preferred form of the tooth means is shown in the drawings wherein:

Figure 1 is a perspective view partly broken away showing a tooth means mounted on the rear side of a raking bar of a rotating reel;

Figure 2 is a view taken on line 2—2 of Figure 1; and

Figure 3 is a perspective view of a modified form of the rake tooth means of this invention.

A conventional side delivery rake makes use of a rotating reel carried in a wheeled frame, the reel including a plurality of rake tooth supporting bars upon which a number of tooth means may be mounted to engage the cut crop for either raking or tedding. The raking bars are driven to have a counterrotation or one revolution for every forward revolution of the reel so that the raking teeth fixed to the bars are always pushed against the crop at approximately the same pitch. Usually the pitch may be adjusted for accommodating the rake to the different conditions of raking various crops and for use in tedding. In normal usage, the raking teeth are subjected to considerable wear and also because the teeth are flexed considerably upon hitting obstacles in the field, it frequently happens that the teeth either break or must be replaced due to wear and so the raking tooth means are designed to be easily replaceable.

The tooth means of this invention are all formed alike of a suitable spring steel wire, and may be provided with two downwardly extending raking teeth 10. The upper ends of a pair of teeth are connected by bending the center portion of the wire in a serpentine form 11 and if the tooth means is to be mounted on a round bar 12, this serpentine section may be formed to a semicircular shape so as to generally fit around the bar as best shown in Figure 2.

The tooth means is preferably mounted on the back side of the raking bar with respect to the forward movement of the bar in its raking action, and the center of the serpentine of the portion of the tooth means is fixed against the bar while the ends are left free to flex. The tooth may be and preferably is removably fixed to the bar by means of the bolt 15 that engages in a centrally disposed bottom loop 16 on the under side of the bar, and on the top side, a plate 17 is engaged under the head of the bolt to press down on the loops 18 of the serpentine portion of the tooth means. The plate has a pair of pins 19 fixed on its under side to engage in loops 18 so as to center the loops and to hold the tooth means in a relatively fixed position on the raking bar.

A plurality of such tooth means may be similarly mounted on each of the several raking bars 12 forming the reel and the bars may be made to rotate in a counter direction with respect to the rotation of the reel to effect either a raking or tedding action as explained above. Once the tooth means have been assembled on the reel, the rake is ready for operation and the crop may be raked into a windrow or tedded to permit further curing in the usual manner.

It will be noted in Figure 2 that the serpentine section of the tooth means rather closely fits the periphery of the round raking bar 12, and during the normal operation of the teeth, they tend to rotate around that surface of the bar as they flex backwardly during the raking operation so as to stress the spring sections formed by the serpentine bending. This stress results whenever a tooth 10 hits an obstruction or whenever it is otherwise loaded during the raking operation. Because of the fit of the serpentine section around the raking bar, the springing action of each tooth means is guided and further a frictional action is established in all portions of the spring, i. e., between the bar and the serpentine sections of the spring, that tends to dampen out a portion of the vibrations that are set up in the springs when a stressed spring is suddenly released.

In certain instances, however, where the loads are suddenly applied to the springs, there may be a tendency for the loops of the serpentine sections to bite into the rake bar before the load can be distributed throughout all portions of the springs, whereby localized sections of the spring means may be overloaded. To avoid any undue wear which may be created by an improper distribution of the stresses throughout all portions of the serpentine sections of the springs, the form of tooth means shown in Figure 3 may be used. The serpentine loops 30 of this tooth means are spaced a bit away from the raking bar except at the center where it is fitted to the bar for the purpose of mounting the tooth means on the bar as described above.

The structure shown in Figure 3, permits each tooth means to flex and the spring loops 30 will have the stress distributed equally throughout all portions of the serpentine section without any tendency to establish local strains because of any binding action produced by the sudden flexing of a tooth 10. Many of the advantages of the form of tooth means of this invention are retained in using this last described form of the tooth under these more unusual circumstances wherein sudden loading of the tooth means is encountered and in addition, the structure eliminates any question of localized wearing by providing a construction in which the whole serpentine spring structure is made to share the load.

Also, it is suggested that the serpentine section may be formed somewhat in the shape of a C so that although it may be formed to substantially the same shape as the outer diameter of the raking bar or is a bit larger than the round raking bar upon which the tooth means is mounted, the length of the opening of the C is shorter than the diameter of the bar. Thus in assembling this form of the tooth means on the bar, it can be snapped over the bar and set in position to be fixed to the bar in the manner already described.

This last C form of tooth has been provided so that when in normal use of the rake, as above explained, it happens that the tooth means breaks due to the continual flexing, the end portion of the tooth is retained on the bar since the C-shaped serpentine end cannot snap off the raking bar until a force is applied to lift the broken section of the tooth off. This construction prevents the broken portion of a tooth means from falling into the cut crop by causing the broken portion to hang onto the bar until it can be removed and replaced.

The tooth means of this invention is preferably mounted on the rear side of the raking bar with respect to the forward direction of the bar during the raking operation. While it may be disposed on the forward side, the rear has been found to be the best position for such a tooth means since the coils or loops of the serpentine spring tend to open up and unwind or loosen from around the rake bar during the normal flexing of the tooth means while performing the raking operation. This is desirable in that it tends to eliminate any binding of the spring on the bar such as would otherwise cause localized wear to take place.

While the description given above covers the preferred form of this invention, it is obvious that many modifications thereof may occur to those skilled in the art which may fall within the scope of the following claims.

I claim:

1. A rake tooth means adapted for mounting on a round raking bar, comprising an elongated strip of spring metal formed with a depending tooth portion and a serpentine connecting portion, including several reversely formed loops with relatively parallel sides, the sides of said loops embracing and conforming generally in curvature to the periphery of said bar, in combination with a bolt disposed through said bar with one end projecting through one of said loops, and means on said end for clamping said loop against the bar, a mounting plate on the other end of said bolt being disposed across the ends of a plurality of loops and having a corresponding plurality of pins respectively disposed in said loops to secure same on the bar and to prevent pivotal movement of the connecting portion about said bolt.

2. A rake tooth means adapted for mounting on a round raking bar, comprising an elongated strip of spring metal formed with a depending tooth portion and a serpentine connecting portion including several reversely formed loops with relatively parallel sides, the sides of said loops embracing and conforming generally in curvature to the periphery of said bar, in combination with a bolt disposed through said bar with one end projecting through one of said loops, and means on said end for clamping said loop against the bar, the other end of said bolt passing between adjoining loops, and a clamp plate carried by said end having portions projecting into said respective adjoining loops.

3. A rake tooth means adapted for mounting on a round raking bar comprising an elongated strip of spring metal formed with a depending tooth portion and a serpentine connecting portion including several reversely formed loops, the sides of said loops embracing and conforming generally in curvature to the periphery of said bar, in combination with a clamping plate disposed across the ends of a plurality of said loops and having a plurality of projections received in the respective loops, and means securing said clamping plate against said loops.

ALLAN R. REDROW.

References Cited in the file of this patent

UNITED STATES PATENTS

| Number | Name | Date |
|---|---|---|
| 2,193,138 | Meyer | Mar. 12, 1940 |